US010698653B2

(12) United States Patent
Raux et al.

(10) Patent No.: US 10,698,653 B2
(45) Date of Patent: Jun. 30, 2020

(54) SELECTING MULTIMODAL ELEMENTS

(71) Applicant: LENOVO (Singapore) PTE, LTD., New Tech Park (SG)

(72) Inventors: Antoine Roland Raux, Cupertino, CA (US); Akshay Chandrashekaran, Mountain View, CA (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 783 days.

(21) Appl. No.: 14/523,739

(22) Filed: Oct. 24, 2014

(65) Prior Publication Data

US 2016/0117146 A1 Apr. 28, 2016

(51) Int. Cl.
*G06F 3/16* (2006.01)
*G06F 3/01* (2006.01)
*G06F 3/0484* (2013.01)

(52) U.S. Cl.
CPC .............. *G06F 3/167* (2013.01); *G06F 3/013* (2013.01); *G06F 3/017* (2013.01); *G06F 3/0484* (2013.01)

(58) Field of Classification Search
CPC ......... G06F 3/167; G06F 3/0484; G06F 3/017
See application file for complete search history.

(56) References Cited

U.S. PATENT DOCUMENTS

| | | | |
|---|---|---|---|
| 9,021,402 B1* | 4/2015 | Li | G06F 3/04883 715/863 |
| 2005/0018834 A1 | 1/2005 | Furnas | |
| 2005/0039108 A1* | 2/2005 | Hudson | G06F 40/14 715/234 |
| 2005/0195952 A1 | 9/2005 | Dyer et al. | |
| 2007/0022372 A1* | 1/2007 | Liu | G06F 17/30029 715/201 |
| 2010/0079498 A1* | 4/2010 | Zaman | G06F 3/0481 345/661 |
| 2010/0281435 A1* | 11/2010 | Bangalore | G06F 3/038 715/863 |
| 2012/0051590 A1 | 3/2012 | Hsu | |
| 2012/0117112 A1* | 5/2012 | Johnston | G06F 16/9537 707/771 |
| 2013/0257780 A1* | 10/2013 | Baron | G06F 3/0416 345/173 |

FOREIGN PATENT DOCUMENTS

| | | |
|---|---|---|
| EP | 2157771 A1 | 2/2010 |
| GB | 2313978 A | 12/1997 |
| WO | 2009/074210 A2 | 6/2009 |

\* cited by examiner

*Primary Examiner* — Sherrod L Keaton
(74) *Attorney, Agent, or Firm* — Kunzler Bean & Adamson

(57) ABSTRACT

For selecting multimodal elements, a method is disclosed that includes receiving a coarse-grained indication indicating a coarse-grained portion of an electronic document, receiving an audio signal comprising a fine-grained indication indicating a fine-grained portion of the coarse-grained portion and a command to be performed on the fine-grained portion, and executing the command on the fine-grained portion in response to receiving the audio signal.

19 Claims, 7 Drawing Sheets

500

Four score and seven years ago our fathers brought forth on this continent a new nation, conceived in liberty, and dedicated to the proposition that all men are created equal.

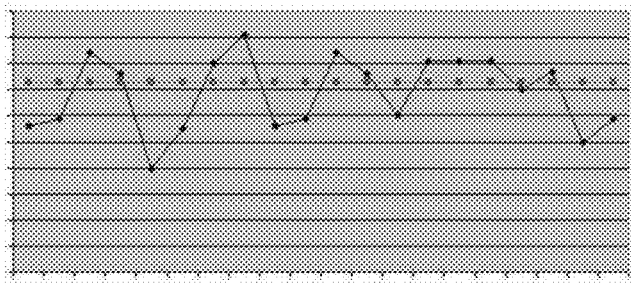

520

Now we are engaged in a great civil war, testing whether nation, or any nation so conceived so dedicated, can long endure. W met on a great battlefield e have come to dedicate a t field, as a final resting place o here gave their lives that night live. It is altogether fitting do this.

530

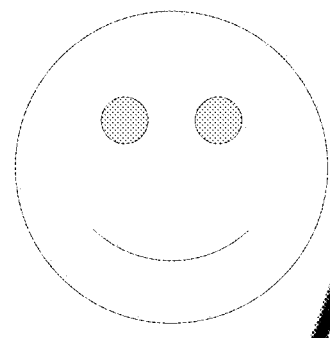

FIG. 5

SELECTING MULTIMODAL ELEMENTS

BACKGROUND

Field

The subject matter disclosed herein relates to computing device interfaces and more particularly relates to selecting multimodal elements.

Description of the Related Art

Computing devices in various fields accomplish a wide variety of electronic tasks. As technology increases, mobile computing devices are become more capable and usable in these different fields.

Typically, a mobile computing device does not include a mouse, or other external pointing device, but is based on a touch screen for interfacing with the computing device. Because mobile computing devices typically include smaller touch screens, selecting elements via touch may be difficult. Furthermore, in general, fingers used to touch portions of the screen may not be accurate enough to select smaller elements, or may not be able to select elements where multiple layers of elements exist at a given location. Additionally, touch resolution capabilities of a mobile computing device may not be precise enough to select certain elements. Furthermore, a given touch point may include more than one selectable element.

BRIEF SUMMARY

An apparatus for selecting multimodal elements is disclosed. In one embodiment, the apparatus may include a processor, and a memory that stores code executable by the processor. In one embodiment, the code may include code that receives a coarse-grained indication indicating a portion of an electronic document, code that receives an audio signal comprising a fine-grained indication indicating a fine-grained portion of the coarse-grained portion and a command to be performed on the fine-grained portion, and code that executes the command on the fine-grained portion in response to receiving the audio signal. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is an illustration depicting one example of selecting multimodal elements;

DETAILED DESCRIPTION

Figure 1:
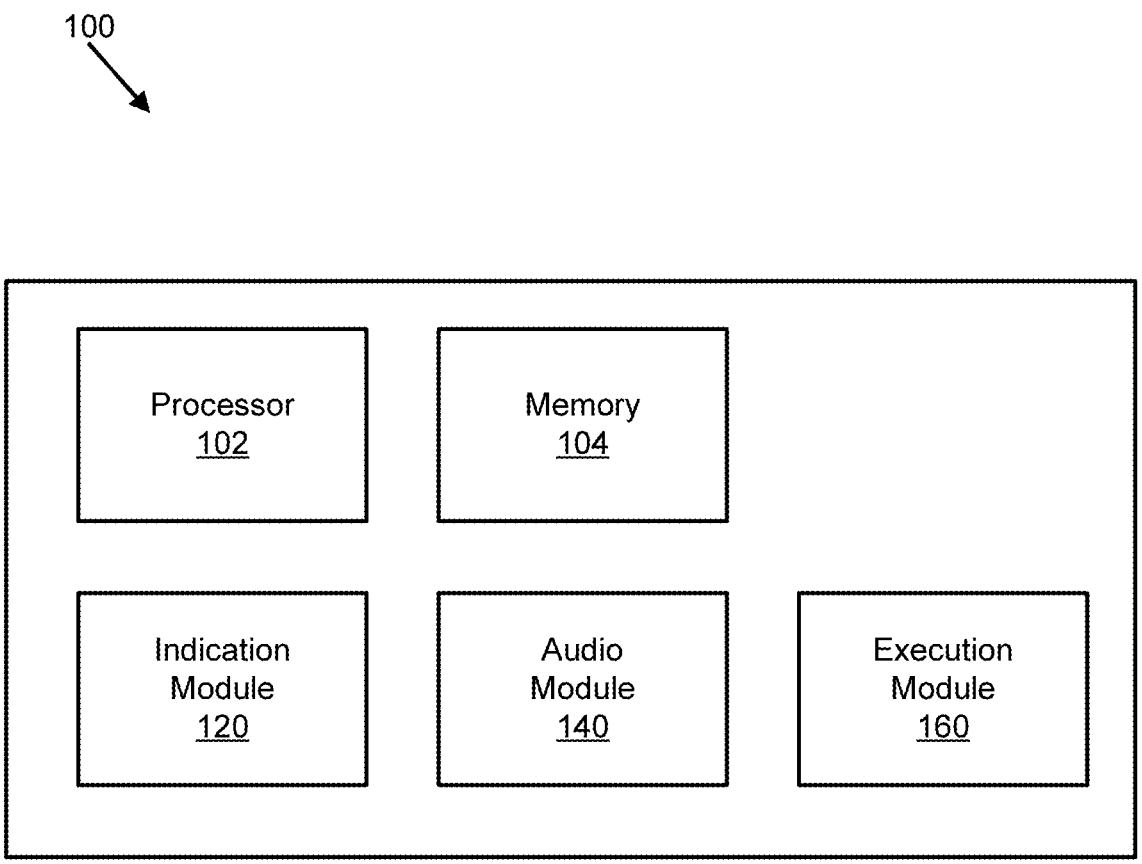
FIG. 1 is a schematic block diagram illustrating one embodiment of an apparatus for selecting multimodal elements.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an apparatus for selecting multimodal elements. In one embodiment, the apparatus 100 includes a processor 102 and a memory 104 that stores code executable by the processor 102. The processor 102 may be any processor capable of executing executable code as one skilled in the art may appreciate. The memory 104 may be any memory storage device that is capable of storing executable code. The memory 104 may be volatile, non-volatile, solid state, magnetic, optical, or other, or the like as one skilled in the art may appreciate.

In one embodiment, the code may include an indication module 120 that may receive an indication. An indication module 120 may detect, determine, receive, or the like, a gesture, a gaze, a touch, a sound, a voice, or other indication, or the like, as one skilled in the art may appreciate. An indication, in certain embodiments, may include any physical movement, such as, but not limited to, directional pointing, facial gestures, single touch gestures, multi-touch gesture, hand gestures, sign language, or other, or the like. In other examples, an indication may include a certain sound, noise, voice, spoken word(s), or other, or the like.

In one embodiment, the indication may include a coarse-grained indication. A coarse-grained indication, as described herein, may include, but is not limited to, an indication that indicates a portion of an electronic document that may include other portions. A coarse-grained indication may substantially include the whole electronic document. Also, because a word may include further portions (characters), a coarse-grained indication may include a word of an electronic document.

In one example, a portion of a document may include a table, and the table may include a cell and/or a paragraph. The coarse-grained indication may indicate the cell of the table that includes the paragraph. A coarse-grained indication may indicate any portion of the document that includes or encompasses another portion. In another example, the document may include a page that includes an image. The coarse-grained indication may indicate the page because the page includes additional elements or portions. In another example, the document may include a paragraph that includes an embedded object. The coarse-grained indication may indicate the paragraph because the paragraph includes other elements of the electronic document.

In one embodiment, the indication module 120 may be implemented as part of a library. In one example, the indication module 120 may be included in an application installation package that may install library files onto a computing device. The library files may be called by executable code from one or more applications. Therefore, in one example, executable code may instantiate an indication module 120 as described herein.

In another embodiment, the indication module 120 may be implemented as part of an application programming interface (API). In one example, the indication module 120 may provide a predefined set of functions or calls callable by one or more applications and/or executable code. In other examples, the API may be part of an industry standard. Providing a standard set of method, functions, or calls, as one skilled in the art may appreciate, may allow programmers from different areas to implement the capabilities of the indication module 120 without having a detailed knowledge of the associated algorithms occurring within the gesture module 120.

In one embodiment, the indication may indicate a portion of an electronic document. An electronic document, as described herein, may include, but is not limited to any electronic media content that may be stored on a memory. An electronic document may be stored in a wide variety of different formats, including, but not limited to, plain text, office formats, word processor formats, graphic formats, image formats, web formats, script formats, code formats, language formats, spreadsheet formats, presentation formats, postscript formats, compressed formats, encrypted formats, portable formats, other formats, or the like. Of course, an electronic document is not limited in this regard.

A portion of an electronic document may include any sub-part of the electronic document, including, but not limited to, a character, a word, a sentence, a paragraph, a page, a chapter, a composition, a book, an image, a presentation, a chart, a table, a cell, header, footer, metadata, title, author, editor, publisher, an embedded object, or other, or the like.

In one embodiment, the portion of the electronic document may include an embedded object. An embedded object may include any structure of elements that may be represented in the electronic document. In one example, an image may be an embedded object. In another example, an audio file may be embedded in the electronic document. In another example, the embedded object may include a video, or the like.

Of course, this disclosure is not limited in this regard as an embedded object may include any type of object storable by executable code. In one example, a word processing application may include a spreadsheet document as an embedded object. In another example, a spreadsheet application may include a chart as an embedded object. In another example a file, other than the electronic document may be embedded in the electronic document. The embedded object or file may include any storable file type. Therefore, in certain embodiments, an embedded object may include a stored file of any type. Of course, one skilled in the art may recognize other types of embedded objects and this disclosure is meant to include all such types.

In certain embodiments, the electronic document may include coarse-grained portions that may be sub-parts of other portions. In one example, a paragraph may be included in a cell of a table. In this example, the portion may be the table and the sub-portion may be the paragraph in the cell. In another example, the electronic document may include a page that includes an image. The indicated portion may include the page and/or the image on the page. As one skilled in the art may appreciate a wide variety of different electronic document formats, schemes, arrangements, layouts, or the like, a portion of an electric document may include any such sub-parts of an electronic document.

In certain embodiments, the electronic document may include a hierarchal structure of elements. For example, the electronic document may include a hyper-text markup language (HTML), wherein embedded tags are used to define various elements of the electronic document. The HTML may identify the various portions and/or the portions that are sub-parts of other portions as one skilled in the art may appreciate. Various sub-parts or portions of the electronic document may be elements of the electronic document. An element of a document, as described herein, may include, but is not limited to a portion, a sub-art, or other, or the like, of an electronic document.

In another example, the electronic document may include a list of files available via the apparatus 100. In this example, the files listed may be the respective portions of the electronic document. Therefore, an application that may display a list of files may display the document.

In one example, an electronic document may include a paragraph that includes a table that includes a sentence that includes a word that includes a character. A coarse-grained portion may include the paragraph, the table, the sentence or the word because these respective elements may include further elements. In one example, a coarse-grained portion may include the paragraph and a fine-grained portion may include the table. In another example, a coarse-grained portion may include the table and a fine-grained portion may include the sentence. Therefore, in certain embodiments, a fine-grained portion may include an element of the electronic document that is included by the coarse-grained portion.

In another embodiment, the fine-grained portion may be substantially similar to the coarse-grained portion. For example, an electronic document may include a page that includes several paragraphs. A coarse-grained indication may indicate the page. A fine-grained indication may also include the page. Therefore, a fine-grained portion may include the coarse-grained portion or any sub-portion of the coarse-grained portion. Similarly, the coarse-grained portion may include more elements than those included in the fine-grained portion. The coarse-grained portion may include many fine-grained portions.

In another embodiment, an application for editing an electronic document may track portions and/or elements within the electronic document. The respective portions may be named, may be tracked using numerical identifiers, tags, or other as one skilled in the art may appreciate. In another example, a file browser application may display a list of files (the portions).

In one embodiment, the apparatus 100 may include a touch sensor. The touch sensor may be included in a touch screen operating at the apparatus 100. In one embodiment, an indication may include a touch on the touch screen. In certain embodiments, a touch sensor may read a touch although the touching object may not physically contact the touch screen. Therefore, in certain embodiments, the touch indication may include a touching object coming close to the touch screen to cause a touch to be registered although the touching object may not physically contact the touch screen. A touching object may be any object or thing sensible by the touch sensor. A touching object may be one or more fingers of a user of the apparatus, a touch tool, a touch instrument, or other, or the like.

In another embodiment, the apparatus 100 may include the gesture sensor 220 (FIG. 2) for sensing the coarse-grained indication. The gesture sensor 220 (FIG. 2) may detect a gesture at the apparatus and the indication module 120 may receive the gesture indication. A gaze indication, in certain embodiments, may include tracking one or more eyes of a user to determine a location where an eye is focused. In one example, the gaze indication may include a user focusing on a point on a display screen of the apparatus. Therefore, in certain embodiments, the indication module 120 may determine a location on a screen of the apparatus, where a user's eyes may be directed, based at least in part on input from a gesture sensor 220.

In another embodiment, the indication module 120 may record a recent number of indications. In certain embodiments, an indication may include a gesture. For example, the indication module 120 may record the past ten gestures. In response to an audio signal, other modules may examine the ten most recent gestures. Of course, other numbers of gestures or indications may be recorded, stored, remembers, or the like, and this disclosure is not limited in this regard.

In another embodiment, the indication module 120 may receive an indication that includes many indications. For example, the indication module 120 may receive an indication that includes a touch gesture and an audio gesture. The touch gesture may indicate a location at the electronic document, and the audio gesture may indicate a type of portion to be selected. In another example, the indication module 120 may receive an indication that includes a gaze indication and an audio indication. The gaze indication may indicate a coarse-grained portion of an electronic document and the audio indication may indicate a fine-grained portion of the coarse-grained portion. For example, a user may gaze at a location that includes a word and a paragraph of an electronic document. The coarse-grained portion may include the paragraph. The audio indication may indicate the word (a fine-grained portion in this example). Therefore, the indication module 120 may receive an indication that includes the indicated word, and the indicated portion may include the indicated word.

In one embodiment, the apparatus 100 includes an audio module 140. In one embodiment, the audio module 140 may receive an audio signal that includes a fine-grained indication indicating a fine-grained portion of a coarse-grained portion. An indicated fine-grained portion, as previously described, may include any portion or sub-part, sub-element, or the like, of any other indicated portion of the electronic document. In one example, a coarse-grained indicated portion may include a paragraph that includes many sentences. The coarse-grained indication may indicate elements of the electronic document at many levels. For example, the coarse-grained indication may indicate the paragraph, a sentence in the paragraph, a word in the sentence, or a character in the word.

The audio module 140 may receive an audio signal that further indicates a portion of the electronic document. For example, the audio signal may include the text "select this sentence." In response, the audio module 140 may determine that the user desires selection of the sentence. Therefore, the audio module 140 may receive an audio signal that indicates a fine-grained portion of the coarse-grained portion of the electronic document.

In one example, the audio module 140 may receive spoken language from a user. In another example, the audio module 140 may receive synthesized language from a computing device, speaker, or the like. In another embodiment, the audio module 140 may receive an audio signal that includes a command to be performed on the indicated portion of the electronic document. In another example, the audio signal may include a command, such as, but not limited to, Morse code, music, predetermined sounds, tone pulse, or other, or the like. Therefore, in certain embodiments, the audio module 140 may receive any sound that may represent a command, or that may be interpreted as a command as one skilled in the art may appreciate.

In one embodiment, predefined sounds may be mapped to commands. For example, certain pitches of sounds may indicate certain commands according to a predefined mapping of commands and pitches.

In one embodiment, the audio module 140 may be implemented as part of a library. In one example, the audio module 140 may be included in an installation package that installs library files onto a computing device. The library files may be called by executable code from one or more applications.

In another embodiment, the audio module 140 may be implemented as part of an application programming interface (API). In one example, the audio module 140 may provide a predefined set of functions or calls callable by one or more applications and/or executable code. In other examples, the API may be part of an industry standard. Providing a standard set of method, functions, or calls, may allow programmers from different areas to implement the capabilities of the audio module 140 without having a detailed knowledge of the associated algorithms performed by the audio module 140.

In another embodiment, the audio module 140 may determine a command represented by the audio signal using voice recognition. For example, the audio module 140 may receive an audio signal that includes a voice command and may use voice recognition to generate text based on the received audio signal. The generated text may include a textual representation of the voice command. For example, a user may say, "Copy this paragraph," "Move this image," "Delete this sentence," or other, or the like.

In certain embodiments, an audio signal may include both an audio indication and an audio command. In one example, a user may speak, "Move this image." The indication module 120 may receive the spoken words and receive an "image" indication based on the audio signal. The audio module may receive the spoken words and receive the "move" command based on the audio signal.

In one example, an electronic document may include paragraph that includes a table that includes another paragraph. Therefore, a command such as "copy this paragraph" in combination with a touch gesture that indicates the paragraph inside the table may be unclear as so which paragraph to copy. The indication may indicate the paragraph that contains the table, or the another paragraph that is inside cell of the table. In order to address this potential ambiguity, the audio module 140 may interpret portions of the verbal command in a sequence.

In one example, the audio command may include "copy this paragraph inside this table." In this example, the user clearly indicates the paragraph that is in a cell of the table. A coarse-grained indication may indicate the table, and the audio signal may indicate the fine-grained portion (the paragraph).

In another example, the audio command may include "copy this paragraph." In this example, a coarse-grained indication may indicate the table and a fine-grained indication may indicate the paragraph inside the table. In one embodiment, a touch gesture may indicate the table and the audio signal may indicate the paragraph inside the table. If the indication (touch gesture) touches the paragraph that is inside the table, then the audio module 140 may interpret the command to mean the paragraph that is inside the table. In another example, if the touch gesture touches the table, but not the paragraph that is in a cell of the table (e.g. a touch point does not necessarily indicate the paragraph), then a command such as "copy this paragraph" may indicate the paragraph that includes the table. Therefore, in certain embodiments, a coarse-grained indication may indicate one element of an electronic document, and a fine-grained indication may indicate a sub-part of the coarse-grained indication. This may be the case although the coarse-grained indication may not indicate the fine-grained indication.

In another embodiment, the audio module 140 may verify that an indication indicates a portion of an electronic document that matches an identified portion included in the command. For example, where the command includes "move this image," the audio module 140 may examine a few previous gestures to determine if an image has been indicated by recent gestures. If an image has been recently indicated by a gesture, then the audio module 140 may match the gesture and the command. If an image has not been indicated by any recent gesture, then the audio module 140 may ignore the received audio command.

In one example, in response to receiving an audio signal that includes a command, the audio module 140 may examine the past four coarse-grained indications to determine if any of the past four coarse-grained indications include a fine-grained portion of an electronic document identified in the audio command. Of course, this disclosure is not limited in this regard and other numbers of recent indications may be considered.

In one embodiment, a coarse-grained indication may substantially indicate a whole electronic document. For example, a coarse-grained indication may include a touch point at a page of a document. The coarse-grained indication may substantially indicate the whole document, a chapter of the document that includes the touch point, a page of the document that includes the touch point, a paragraph of the document that includes the touch point, or any other elements of the document as described herein.

In one embodiment, the audio module 140 may receive an audio signal that includes a fine-grained indication that substantially includes the coarse-grained indication. In one example, the indication module 120 may receive a coarse-grained indication that substantially indicated the whole electronic document. The audio module 140 may receive an audio signal that substantially includes the whole document. For example, the indication module 120 may receive a touch that indicates the whole electronic document. The audio module 140 may receive a fine-grained indication that includes the whole electronic document. For example, the audio module 140 may receive an audio signal that includes "copy this document." In response, the audio module 140 may determine the fine-grained portion (the whole document) based on the coarse-grained indication and the audio signal. Therefore, in certain embodiments, the fine-grained portion may substantially include the coarse-grained portion.

In another embodiment, the apparatus 100 may include an execution module 160. The execution module 160 may execute a received command on an indicated portion of an electronic document in response to the audio module 140 receiving an audio signal as described herein. The indicated portion may include a fine-grained indicated portion as described herein.

In one embodiment, the fine-grained indicated portion may be based on the coarse-grained indication and the audio signal. In one embodiment, the execution module 160 may combine a coarse-grained indication received by the indication module 120, and a fine-grained indication received by the audio module 140. For example, the coarse-grained indication may indicate a paragraph in an electronic document. The fine-grained indication may similarly indicate a point that includes a page, a paragraph, a sentence, a word, or similar portions that may include the indicated point. Furthermore, the audio signal may include a command to "copy this paragraph." In response to receiving this audio signal, the audio module 140 may indicate that the command further indicates a paragraph. Therefore, by combining the coarse-grained indication and the audio signal, the execution module 160 may determine that the user indicates the paragraph, based on the coarse-grained indication and the fine-grained indication included in the audio signal.

In one embodiment, the execution module 160 may be implemented as part of a library. In one example, the execution module 160 may be included in an installation package that installs library files onto a storage device of the apparatus 100. The library files may be called by executable code from one or more applications.

In another embodiment, the execution module 160 may be implemented as part of an application programming interface (API). In one example, the execution module 160 may provide a predefined set of functions or calls callable by one or more applications. In other examples, the API may be part of an industry standard. Providing a standard set of method, functions, or calls, may allow programmers from different programming groups to implement the capabilities of the execution module 160 without having a detailed knowledge of the associated algorithms performed by the execution module 160.

In one example, the apparatus 100 may display a list of files via a display for the apparatus 100. The user may touch the display at a file in this list of files and may speak a command "copy this file." The indication module 120 may receive the touch gesture as a gesture that indicates a file selected from the list of files. The audio module 140 may receive the audio signal that includes the "copy this file" command. The audio module 140 may convert the audio signal to a "copy" command. In response to the indication module 120 receiving a coarse-grained indication indicating the file, and the audio signal indicating the command, the execution module 160 may copy the indicated portion (the file) to a clipboard for the apparatus, or other memory.

In another example, the electronic document may include a table. The user may gesture (a coarse-grained indication) to the table using a touch as a display for the apparatus 100, or may direct eyes (a coarse-grained indication) towards the table. The gesture module 120 may determine that the user's eyes are directed at the table and may determine that the user indicates the table in the electronic document. The user may generate an audio signal that includes "email table to John."

The audio module 140 may use voice recognition and/or natural language processing to convert the audio command to an executable command. The executable command may include a command to email the table to John. The execution module 160 may execute the command by copying the table into an email prepared for "John." In one example, the execution module 160 may determine an email for "John" by looking up "John" in a contact list at the apparatus 100. The execution module 160 may then command an email application or similar to email the table to "John."

In certain embodiments, the execution module 160 may generate one or more commands that may include any commands executable by an application executing at the apparatus 100. A non-limited list of potential commands, include copy, paste, delete, translate, move, save, share, email, tweet, post, insert, or other, or the like. Of course, one skilled in the art may recognize other commands that the execution module 160 may generate based on an audio signal.

In another example, a user may gesture to indicate a portion of text within the electronic document. The user may speak a command, such as, "translate this paragraph." The execution module 160 may determine, based on the command and the gesture, that the user indicates the paragraph. The execution module 160 may generate a command to "translate" the indicated paragraph. In another example, the execution module 160 may forward the command to an application for processing. The application may execute the command received from the execution module 160.

Figure 2:
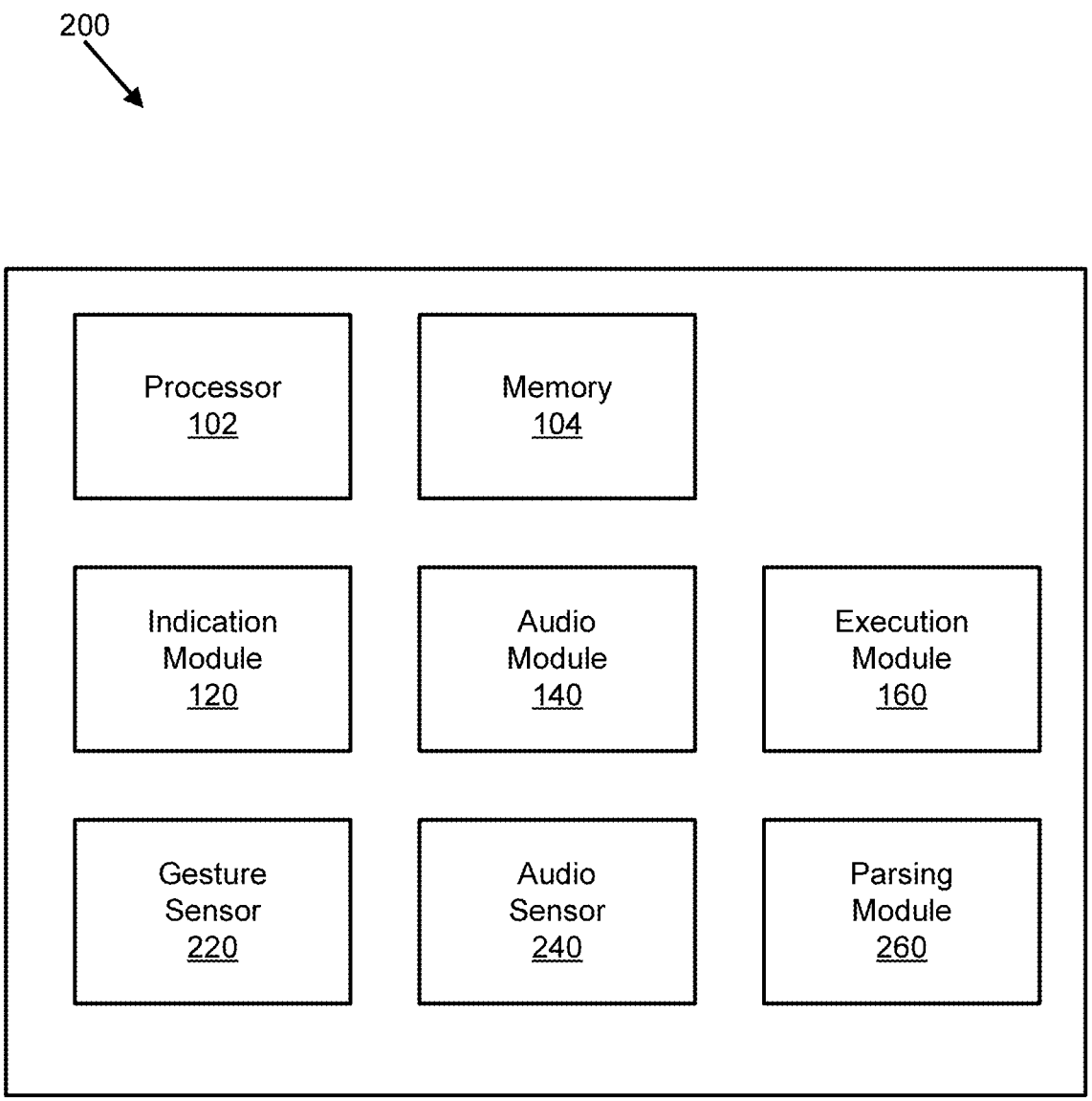
FIG. 2 is a schematic block diagram illustrating one embodiment of an apparatus for selecting multimodal elements.

FIG. 2 is a schematic block diagram illustrating one embodiment of an apparatus for selecting multimodal elements. Multimodal elements may include any elements of an electronic document wherein a single indication may indicate more than one element in the electronic document. In one embodiment an electronic document may include a spreadsheet that includes many cells, wherein one cell may include a chart. Because an indication at the chart may indicate the chart, the cell that includes the chart, or the spreadsheet that includes the cell, the elements may be multi-modal.

In one embodiment, the apparatus 200 may include a processor 102, the memory 104, the gesture module 120, the audio module 140, the execution module 160, a gesture sensor 220, an audio sensor 240, and a parsing module 260. The processor 102, the memory 104, the gesture module 120, the audio module 140, and the execution module 160 may or may not be substantially similar to those depicted in FIG. 1.

In one embodiment, the apparatus 200 may include the gesture sensor 220. The indication module 120 may receive a coarse-grained indication by receiving a gesture from the gesture sensor 220. The coarse-grained indication may indicate any point that may indicate multi-modal elements. The gesture sensor 220 may be any device or sensor capable of sensing a gesture. In one example, the gesture sensor 220 may include wired gloves. The wired gloves may detect finger pointing, motion, finger bending, haptics, hand positions, or other gestures, or the like. In another example, the gesture sensor 220 may include a depth-aware camera. A depth-aware camera may generate a depth map of a user to determine gestures being performed by the user. The depth-aware camera may approximate a three dimensional representation of the user and may detect gestures by a user.

In another example, the gesture sensor 220 may include stereo cameras. Multiple cameras may cooperate to generate a three-dimensional representation in order to sense a gesture by a user. The cameras may be lexian-stripe or infrared emitters, or other, or the like. In another example, the gesture sensor 220 may include a controller as an extension of a body of the user. For example, a remote controller in a hand for the user may sense gesture by the user. The controller may include accelerometers, gyroscopes, and/or other sensors to translate gesture into movement. In another example, the gesture sensor 220 may include other cameras that may sense a gesture by a user, or other, or the like. In certain examples, the gesture module 120 may include any and all algorithms associated with the gesture sensors 220 previously described as one skilled in the art may appreciate.

In one embodiment, the apparatus 200 may include the audio sensor 240. In one embodiment, the audio module 140 may communicate with an audio sensor 240 to receive an audio signal. In one example, the audio sensor 240 may include a microphone. The microphone may sense an audio signal as one skilled in the art may appreciate. The audio sensor 240 may include a wide variety of circuits or devices that may detect variations in pressure that may indicate sound waves. The audio sensor 240 may receive audio that includes an audio gesture and/or an audio command.

In one embodiment, the apparatus 200 may include the parsing module 260. The parsing module 260 may, in certain embodiments, parse an electronic document to define various portions. The various portions may be based on characters, sentences, graphics, images, tables, links, other objects, document metadata, or other, or the like. In one example, the parsing module 260 may parse an electronic document into paragraphs, wherein respective paragraphs may be portions of the electronic document.

In another embodiment, the parsing module 260 may parse the electronic document into a hierarchal structure of elements. For example, an electronic document may include multiple chapters that include multiple paragraphs that include multiple sentences that include multiple words that include multiple characters. The parsing module 260 may parse the electronic document into the respective paragraphs, and respective paragraphs into respective sentences, and respective sentences into respective words, and respective words into respective characters. Therefore, the parsing module 260 may generate a hierarchal structure that represents the respective portions of the electronic document. Furthermore, where a paragraph may include an image, the image may be included as a sub-part of the associated paragraph. In this example, a coarse-grained indication may include the whole document, a chapter, a paragraph, a sentence, or a word, or any other elements that may include additional elements.

In one embodiment, the electronic document may have been previously processed so that it includes metadata to identify certain portions or elements. An application managing the electronic document may recognize charts, page, paragraphs, images, or other or the like, and may flag the respective elements or portions accordingly. In one example a PDF file may include metadata. In another example, a web page may include HTML tags to identify certain portions as one skilled in the art may appreciate. In another example, an electronic document may include structure information to identify certain portions or elements.

Figure 3:
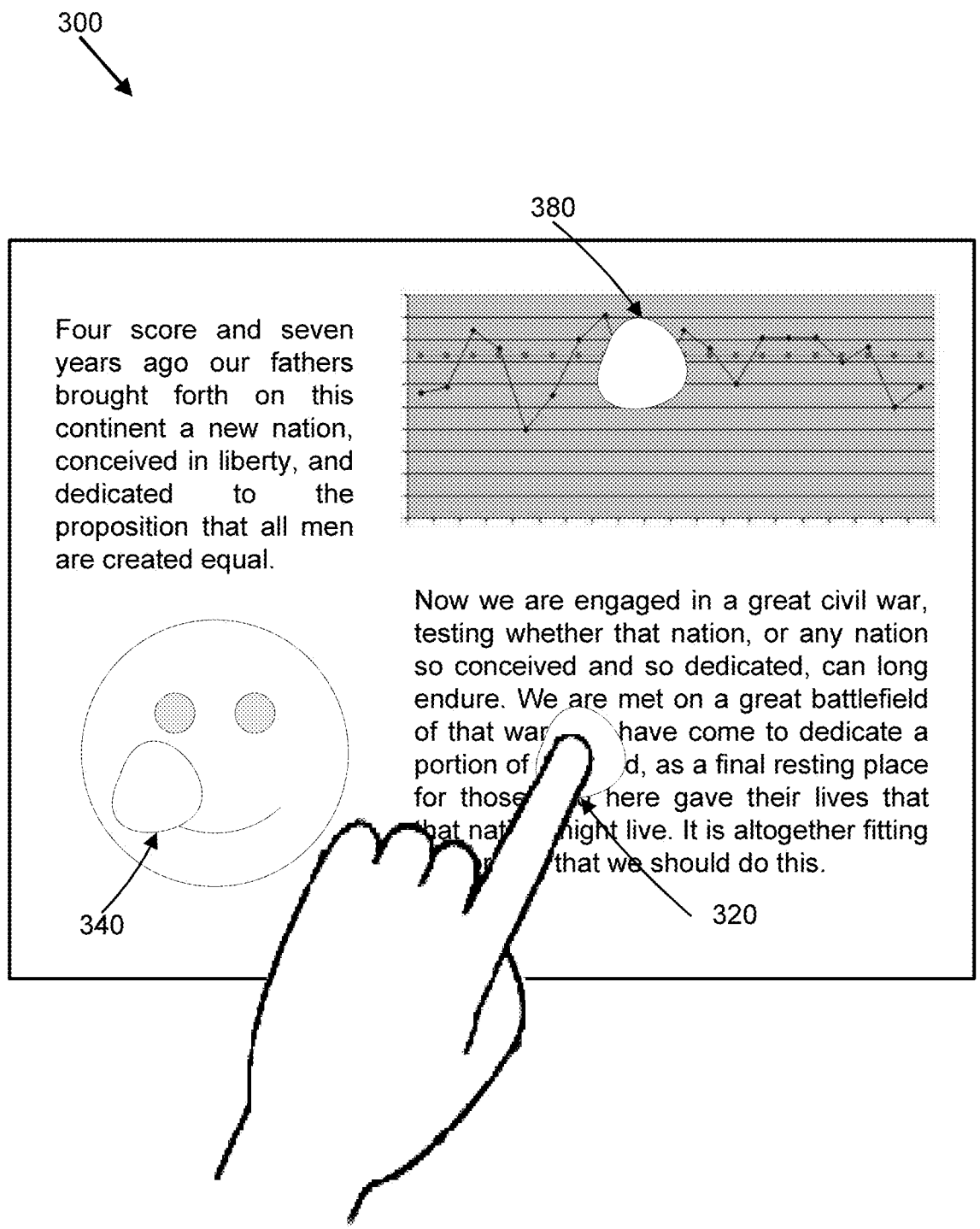
FIG. 3 is an illustration depicting one example of selecting multimodal elements.

FIG. 3 is an illustration depicting one example of selecting multimodal elements. In one example, an electronic document may include text, images, and/or charts. A user may touch a screen displaying the electronic document at a location 320. At location 320, the electronic document may include the document, the page, a paragraph, a word, or a character. In this example, the touch location 320 may include the entire document, the page that includes the displayed elements, the paragraph that includes "Now we are . . . ," the word "war," and/or the character 'r'.

In certain embodiments, because the electronic document may include many multimodal elements (or many portions) at a location 320, the indication module 120 may have difficulty determining which of the multimodal elements to select. In cooperation with a coarse-grained indication, a user may speak the command "select this paragraph." The audio module 140 may determine that the user intends to select a paragraph, based on the audio signal, the audio signal including a fine-grained indication (indicating the paragraph) and a command to be performed on the fine-grained portion (the paragraph). The execution module 160 may determine that the user desires selection of the paragraph at location 320 because a "paragraph" is one of the selectable multimodal elements at location 320 and the user has indicated to select a paragraph. Therefore, the execution module 160 may select the paragraph at location 320 instead of the page, word, character, or other.

In a similar example, the indication module 120 may determine that the user touched location 340. The indication module 120 may indicate that the user's gesture indicates either the page or the image at location 340. The user may speak "delete this image." The audio module 140 may receive the audio signal and may interpret the language to mean that the user desires to select the image. The execution module 160 may determine that the user desires to select the image based on an image being one of the selectable multimodal elements at location 340 and an "image" being included in the user's spoken command. Therefore, the execution module 160 may select the image at location 340 based on the user's gesture and the user's spoken command. The execution module 160 may delete the image according to the gesture and the spoken command.

In a similar example, the indication module 120 may determine that the user is gazing at location 380. The indication module 120 may indicate that the user's gesture (a coarse-grained indication) indicates either the page or the chart at location 380. The user may speak "edit this chart." The audio module 140 may receive the audio signal that includes a fine-grained indication (the chart) and a command to be performed ("edit"). In response the audio module 140 may interpret the language to mean that the user desires to perform a command on the chart. The execution module 160 may determine that the user desires to edit the chart based on the chart being one of the selectable multimodal elements at location 380 and a "chart" being included in the fine-grained indication. Therefore, the execution module 160 may select the chart at location 380 based on the user's coarse-grained indication (the gaze gesture) and the user's fine-grained indication (the spoken command). The execution module 160 may edit the chart according to the gesture and the spoken command.

In another example, a browser may display a web page that includes many multimodal elements at a location on the page. A user may touch a touchscreen displaying the web page at the location. The gesture module 120 may determine one or more multimodal elements that may be present at that location as previously described. The audio module 140 may receive an audio signal that includes "download this image." The audio signal may include a fine-grained indication ("this image"), and a command ("download"). Based on an image being at the touch location of the user, the execution module 160 may execute the command and download the selected image. Combining a physical indication (a coarse-grained indication) and a spoken command may allow a user to perform action and/or commands on multimodal elements more quickly than with present element selection methods.

Figure 4:
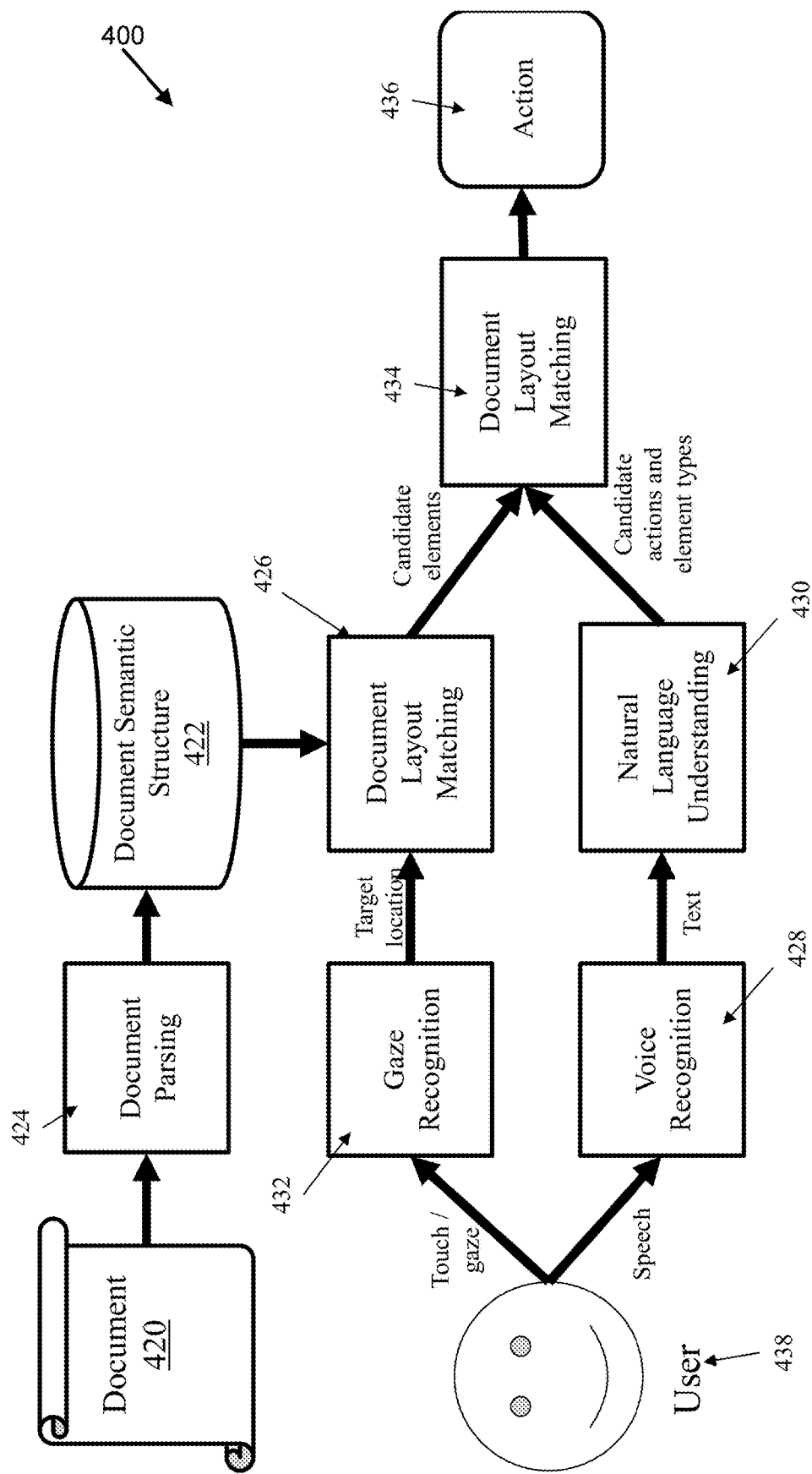
FIG. 4 is a schematic flow chart diagram illustrating one embodiment of a method for selecting multimodal elements.

FIG. 4 is a schematic flow chart diagram illustrating one embodiment 400 of a method for selecting multimodal elements. In one embodiment, a parsing module 260 may parse 424 an electronic document 420. The parsing module 260 may store a structure of the electronic document 420 at a database 422, or other storage medium. The parsing module 260 may store a hierarchy of elements or portions at the storage medium 422.

Additionally, an indication module 120 may receive 432 a coarse-grained indication from a user that includes a gaze gesture. 438. The gesture module 120 may recognize 432 the gaze gesture. At a similar time, the audio module 140 may receive an audio signal from the user 438 that may include a fine-grained indication and a verbal command. The audio module 140 may use voice recognition 428 to generate a textual representation of the audio signal. The audio module 140 may use natural language processing to convert the textual representation of the command to an executable command.

The indication module 120 may compare a target location of the gesture to the semantic structure of the electronic document in order to match document multimodal elements. The indication module 120 may determine a set of multimodal elements that may be located at the target location. The execution module 160 may compare candidate elements (elements at the target location) and candidate element types (based on the command) and may determine a multimodal element based on the multimodal elements that may match. Therefore, the execution module 160 may determine 434 the indicated multimodal element and may perform 436 one or more actions based on a coarse-grained indication, a fine-grained indication, and the command.

In certain embodiments, reception of the gaze indication 432 and reception of audio signal may coincide temporally, may occur at the same or at a similar time, or may occur within a threshold amount of time. Therefore, this disclosure is not limited to any specific time differential between a coarse-grained indication and reception of the audio signal. In one example, the execution module 160 may coordinate between reception of a coarse-grained indication and reception of an audio signal based on a 1 second time differential between reception of the coarse-grained indication and reception of the audio signal.

FIG. 5 is an illustration depicting one example of selecting multimodal elements. In one example, an apparatus 100 may display an electronic document. The document may include paragraphs, images, chart, tables, or the like, as previously described. In one embodiment, the indication module 120 may receive a coarse-grained indication that includes a multi-touch gesture. The multi-touch gesture may include a first touch point 520 and a second touch point 530. The indication module 120 may receive the multi-touch gesture indication based on a touch sensor, or the like. A type of the multi-touch gesture may further indicate the indicated portion of the electronic document.

In one example, a user may touch point 520 and point 530 and bring them closer together. This kind of multi-touch gesture indication (a coarse-grained indication) may further indicate the coarse-grained portion. For example, although the coarse-grained portion may include the whole document, a specific coarse-grained indication (the multi-touch gesture) may limit the coarse-grained portion. Other multi-touch gesture may further indicate other coarse-grained portions. For example, touching touch point 520 and 530 and spreading the touch points apart may indicate a coarse-grained portion that includes the whole electronic document.

In another example, a user may touch point 520 and point 530 and spread them further apart. Spreading two touch points further apart may indicate to select a page of the electronic document. In one example, touching points 520 and 530 and rotating the two points about each other may indicate a sentence. Therefore, in certain embodiments, the execution module 160 may perform an indicated command based on both the indication and the audio signal.

In one embodiment, the apparatus may provide a configuration utility whereby a user may associate a certain indication with certain commands. For example, a user may associate two touch points rotating to indicate a "translate" command. Therefore, a user may indicate a portion of an electronic document and may indicate a command to be performed using the gesture. The user may speak a command that may further indicate the portion of the electronic document to be translated.

Figure 6:
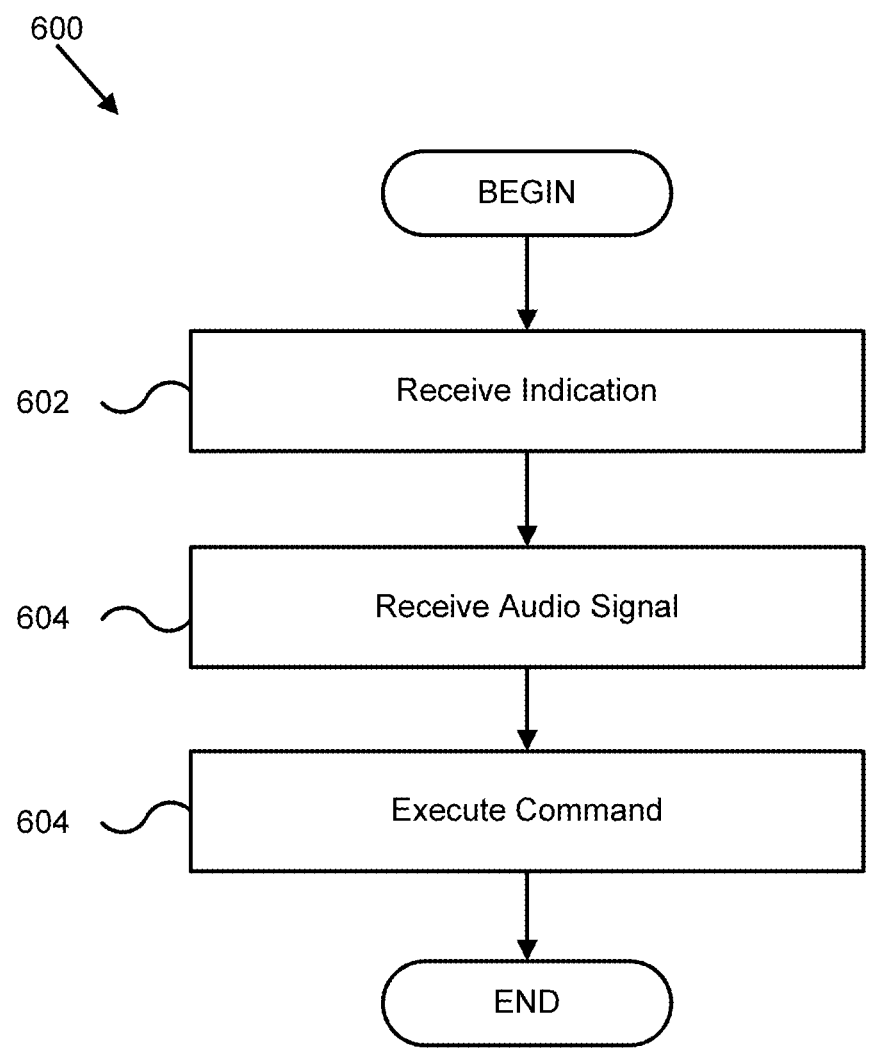
FIG. 6 is a schematic flow chart diagram illustrating one embodiment of a method for selecting multimodal elements.

FIG. 6 is a schematic flow chart diagram illustrating one embodiment of a method for selecting multimodal elements. In one embodiment, the method 600 may begin and the indication module 120 may receive 602 a coarse-grained indication that indicates a portion of an electronic document. The coarse-grained indication may be selected from the group consisting of a gaze gesture, a touch gesture, an audio gesture, or other, or the like.

In other embodiments, the coarse-grained indication may indicate one or more portions of an electronic document. The audio module 140 may receive 604 an audio signal that includes a fine-grained indication and represents a command to be performed on the fine-grained indicated portion of the electronic document. In certain embodiments, the indication module 120 may receive the indication before the audio module 140 receives an audio signal. In other embodiments, the audio module 140 may receive the audio signal before the gesture module 120 receives the gesture. In another embodiment, the indication module 120 may receive the indication at substantially the same time as the audio module 140 receives the audio signal. Therefore, the indication module 120 may receive the indication and the audio module may receive the audio signal in any temporal order.

The execution module 160 may execute 606 the indicated command on the indicated portion based on the indication module 120 receiving the indication and/or the audio module 140 receiving the audio signal and the method 600 may end.

In another embodiment, the audio module 140 may determine the command using voice recognition. The audio module 140 may convert the audio signal to a textual representation of the command based on voice recognition as one skilled in the art may appreciate. In a further embodiment, the execution module 160 may use natural language processing to determine the command represented by the audio signal.

Figure 7:
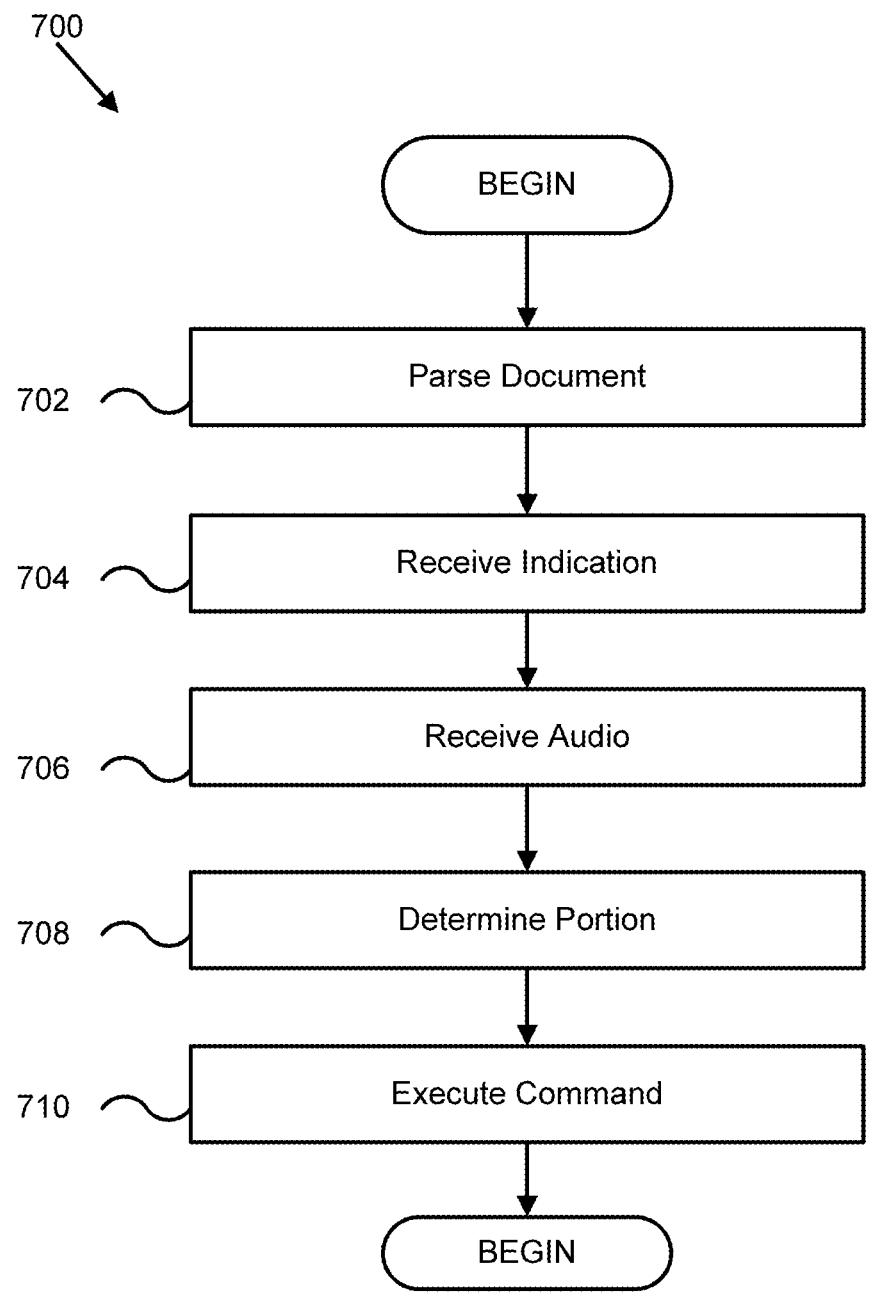
FIG. 7 is a schematic flow chart diagram illustrating one embodiment of a method for selecting multimodal elements.

FIG. 7 is a schematic flow chart diagram illustrating one embodiment of a method for selecting multimodal elements. In one embodiment, the method 700 may begin and the parsing module 260 may parse 702 an electronic document into multiple portions or elements. The indicated portion may be one of the multiple portions. The indication module 120 may receive 704 a coarse-grained indication that may indicate a portion of the electronic document. The audio module 140 may receive 706 an audio signal that may represent a command to be performed on the indicated portion of the electronic document. The execution module 160 may determine 708 the portion of the electronic document based, at least in part, on the coarse-grained indication and the command represented by the audio signal. The execution module 160 may execute 710 the command and the method 700 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor, the code comprising:
  code that receives a coarse-grained indication to locate a coarse-grained portion of an editable electronic document;
  code that receives an audio signal, the audio signal comprising:
    a fine-grained indication to locate a fine-grained portion of the coarse-grained portion,
    a user command to be performed on content of the electronic document in the fine-grained portion, and
    a sound pitch of a plurality of sound pitches;
  code that, in response to receiving the audio signal, examines a predetermined quantity of previous coarse-grained indications to determine whether the previous coarse-grained indications include the fine-grained portion; and
  code that:
    ignores the user command in response to determining that the user command does not match the fine-grained portion indicated in one of the previous coarse-grained indications of the predetermined quantity of previous coarse-grained indications, and executes the user command on the fine-grained portion in response to determining that the user command matches the fine-grained portion indicated in one of the previous coarse-grained indications of the predetermined quantity of previous coarse-grained indications, wherein:
the electronic document comprises one of a plain text document and a word processing document,
the coarse-grained portion is a sub-portion of the electronic document,
the fine-grained portion is a sub-portion of the coarse-grained portion,
each of the plurality of sound pitches is mapped to a respective user command,
the sound pitch in the audio signal is a particular sound pitch mapped to the user command, and
the user command is a particular user command that rearranges data in the content of the electronic document, and
one of the coarse-grained portion and the fine-grained portion comprises a set of paragraphs.

2. The apparatus of claim 1, wherein the code further comprises code that parses the electronic document into a plurality of portions, the fine-grained portion selected from the plurality of portions.

3. The apparatus of claim 2, wherein the code that parses further parses the electronic document into a hierarchal structure of elements, the fine-grained portion comprising one of the elements.

4. The apparatus of claim 1, wherein the code further comprises code that determines the fine-grained portion based on the coarse-grained indication and the audio signal.

5. The apparatus of claim 1, wherein the coarse-grained indication is selected from the group consisting of a touch indication, a gaze indication, and an audio indication.

6. The apparatus of claim 1, wherein a portion of the executable code is implemented as code selected from the group consisting of a library and an application programming interface, the fine-grained portion selected from the group consisting of the whole electronic document, a page, a paragraph, a sentence, a word, a character, a table, a cell, a chart, an image, a link, and an embedded object.

7. A method comprising:
receiving a coarse-grained indication to locate a coarse-grained portion of an editable electronic document;
receiving an audio signal, the audio signal comprising:
a fine-grained indication to locate a fine-grained portion of the coarse-grained portion,
a user command to be performed on content of the electronic document in the fine-grained portion, and
a sound pitch of a plurality of sound pitches;
in response to receiving the audio signal, examining a predetermined quantity of previous coarse-grained indications to determine whether the previous coarse-grained indications include the located fine-grained portion;
ignoring the user command in response to determining that the user command does not match the located fine-grained portion indicated in one of the previous coarse-grained indications of the predetermined quantity of previous coarse-grained indications; and
executing the user command on the fine-grained portion in response to determining that the user command matches the located fine-grained portion indicated in one of the previous coarse-grained indications of the predetermined quantity of previous coarse-grained indications, wherein:
the electronic document comprises one of a plain text document and a word processing document,
the coarse-grained portion is a sub-portion of the electronic document,
the fine-grained portion is a sub-portion of the coarse-grained portion,
each of the plurality of sound pitches is mapped to a respective user command,
the sound pitch in the audio signal is a particular sound pitch mapped to the user command, and
the user command is a particular user command that rearranges data in the content of the electronic document, and
one of the coarse-grained portion and the fine-grained portion comprises a set of paragraphs.

8. The method of claim 7, further comprising parsing the electronic document in a plurality of portions, the fine-grained portion selected from the plurality of portions.

9. The method of claim 7, further comprising parsing the electronic document into a hierarchal structure of elements, the fine-grained portion comprising one of the elements.

10. The method of claim 7, further comprising determining the fine-grained portion based on the coarse-grained indication and the audio signal.

11. The method of claim 7, further comprising determining the user command represented by the audio signal using voice recognition.

12. The method of claim 7, wherein the coarse-grained indication is selected from the group consisting of a touch indication, a gaze indication, and an audio indication.

13. A program product comprising a computer-readable hardware storage device that stores code executable by a processor, the executable code comprising code to perform:
receiving a coarse-grained indication to locate a coarse-grained portion of an editable electronic document;
receiving an audio signal, the audio signal comprising:
comprising a fine-grained indication to locate a fine-grained portion of the coarse-grained portion,
a user command to be performed on content of the electronic document in the fine-grained portion, and
a sound pitch of a plurality of sound pitches;
in response to receiving the audio signal, examining a predetermined quantity of previous coarse-grained indications to determine whether the previous coarse-grained indications include the located fine-grained portion;
ignoring the user command in response to determining that the user command does not match the located fine-grained portion indicated in one of the previous coarse-grained indications of the predetermined quantity of previous coarse-grained indications; and
executing the user command on the fine-grained portion in response to determining that the user command matches the located fine-grained portion indicated in one of the previous coarse-grained indications of the predetermined quantity of previous coarse-grained indications, wherein:
the electronic document comprises one of a plain text document and a word processing document,
the coarse-grained portion is a sub-portion of the electronic document, the fine-grained portion is a sub-portion of the coarse-grained portion, each of the plurality of sound pitches is mapped to a respective user command, the sound pitch in the audio signal is a particular sound pitch mapped to the user command, and the user command is a particular user command that rearranges data in the content of the electronic document, and one of the coarse-grained portion and the fine-grained portion comprises a set of paragraphs.

14. The program product of claim 13, the code further parses the electronic document into a plurality of portions, the fine-grained portion selected from the plurality of portions.

15. The program product of claim 13, the code further parses the electronic document into a hierarchal structure of elements, the fine-grained portion comprising one of the elements.

16. The program product of claim 13, the code further determines the fine-grained portion based on the coarse-grained indication and the audio signal.

17. The program product of claim 13, the code further determines the user command represented by the audio signal using voice recognition.

18. The program product of claim 13, wherein the coarse-grained indication is selected from the group consisting of a touch indication, a gaze indication, and an audio indication.

19. The program product of claim 13, wherein a portion of the executable code is implemented as code selected from the group consisting of a library and an application programming interface, the fine-grained portion selected from the group consisting of the whole electronic document, a page, a paragraph, a sentence, a word, a character, a table, a cell, a chart, an image, a link, and an embedded object.

* * * * *